Aug. 12, 1924.

P. L. MARDIS

TROLLEY

Filed Feb. 4, 1921

1,504,569

WITNESSES:

INVENTOR
Paul L. Mardis
BY
ATTORNEY

Patented Aug. 12, 1924.

1,504,569

UNITED STATES PATENT OFFICE.

PAUL L. MARDIS, OF SWISSVALE, PENNSYLVANIA, ASSIGNOR TO WESTINGHOUSE ELECTRIC & MANUFACTURING COMPANY, A CORPORATION OF PENNSYLVANIA.

TROLLEY.

Application filed February 4, 1921. Serial No. 442,389.

*To all whom it may concern:*

Be it known that I, PAUL L. MARDIS, a citizen of the United States, and a resident of Swissvale, in the county of Allegheny and State of Pennsylvania, have invented a new and useful Improvement in Trolleys, of which the following is a specification.

My invention relates to trolleys for use in electrically-propelled vehicles and particularly to means for locking a pantograph or other trolley frame in its retracted position and disconnecting it from a conductor to a transmission system within the vehicle.

The object of my invention is to provide means whereby a pantograph frame may be locked in its inoperative position and, at the same time, be automatically isolated from live conductors and be rendered safe against the results of accidental engagement with live conductors.

Heretofore, in cutting out a pantograph frame, it has been locked in retracted position by means of chains or other retaining devices, but, if the conductor were not first disconnected from the frame or, if, while the frame was locked down, the conductor should be connected to the frame, the chains would be burned and fall apart. Another objection arose from the danger to workmen engaged in repairing the frame, as a result of shock in case the lead were inadvertently connected to the frame or accidental engagement took place between a live conductor and the frame.

I provide a disconnecting switch for breaking the connection between the pantograph frame and the conductor which is part of the system located on the car or train of cars and utilize the movable member of this switch as a "holding-down" device for the frame and also as a means for connecting it to a ground terminal. Thus, the act of locking the frame automatically insures against inadvertent connection of the conductor and also automatically connects it to a ground terminal to protect against the results of accidental engagement with a live conductor.

My apparatus is illustrated in the accompanying drawing, wherein—

Figure 1:
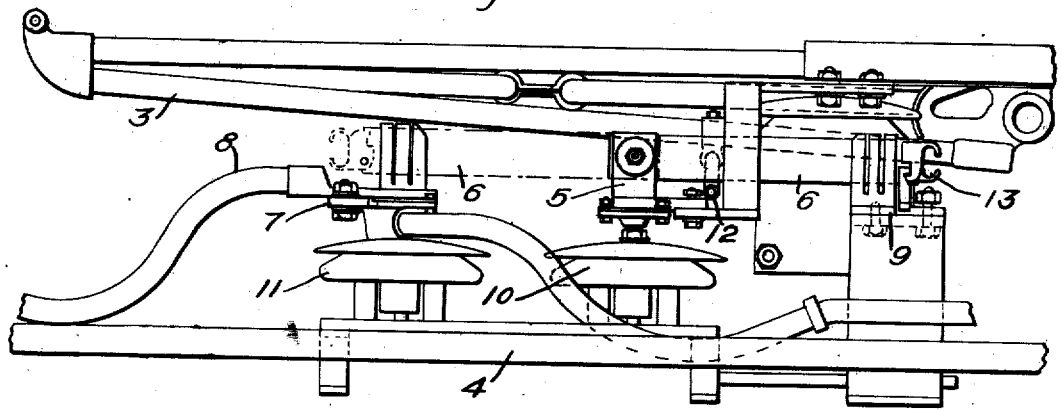
Figure 2:
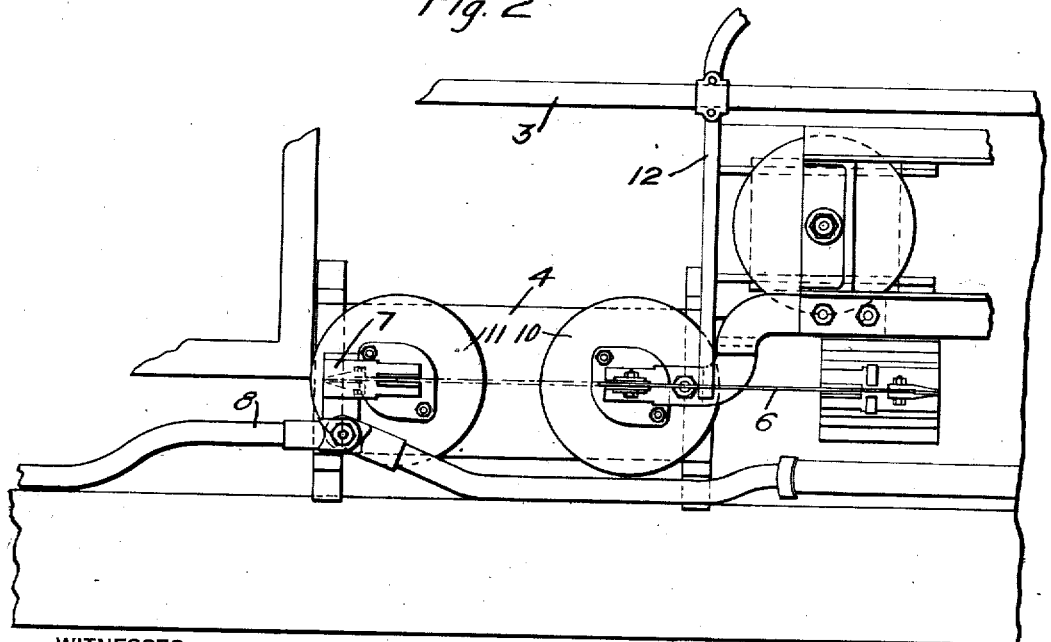

Figs. 1 and 2 are side elevational and plan views, respectively, of a portion of a pantograph frame having my apparatus applied thereto.

A frame 3 may be of any desired construction and supported on a car roof 4 in the usual manner.

The frame 3 serves to conduct current from a supply conductor (not shown) through a terminal 5 and switch member 6 to a terminal 7 and a conductor 8 that conveys the current to the motors of the car or to another car, in the usual manner. A ground terminal 9 is provided for engagement by the switch member 6, when in the full-line position illustrated in the drawing. The terminals 5 and 7 are mounted on insulators 10 and 11, respectively.

A bar 12 is secured to the frame 3 and extends laterally with respect thereto, in a horizontal plane. When the frame 3 is in its retracted position, the bar 12 lies below the position occupied by the switch blade 6, as illustrated in the drawings.

When the switch blade is thrown to the position indicated in broken and dotted lines in Fig. 1, the bar 12 is released and the frame 3 is free to rise to its operative position. If, for any reason, it is desired to "cut out" the frame, it is brought to its retracted position, and the blade 6 is swung to the full-line position illustrated in the drawings, thus disconnecting the frame from the conductor 8 and connecting it to the ground. A latching device 13 is provided to hold the blade in locked position, with respect to the frame, and to prevent movement thereof to its advanced position.

From the foregoing, it will be seen that, so long as the frame is maintained in its retracted position, there is no danger of its being inadvertently connected to the motor conductor and that the ground connection serves as a further protection to the device and to the workmen employed thereon.

Various modifications may be made in the construction without departing from the scope of the same, as defined in the accompanying claims.

I claim as my invention:—

1. In combination, a pantograph frame adapted, when in advanced position, to conduct current from a line conductor to a second conductor, a switch member for connecting the frame to the second conductor and a bar on said frame, said switch being adapted to retain said bar and frame in retracted position.

2. In combination, a pantograph frame adapted, when in advanced position, to conduct current from a line conductor to a second conductor, a switch member for connecting the frame to the second conductor, said switch member being adapted, when in open position with respect to the second conductor, to serve as a retaining device for the frame, and a ground terminal in position to be engaged by the switch member when said member is being utilized to hold the frame in retracted position.

3. The combination with a pantograph frame, of a disconnecting switch adapted, when in one position, to serve as a connecting member between the pantograph frame and a conducting member and, when in another position, to maintain the frame in retracted position and additional means for locking said switch in said second position.

4. The combination with a pantograph frame, of a disconnecting switch adapted, when in one position, to serve as a connecting member between the pantograph frame and a conducting member and, when in another position, to maintain the frame in retracted position and to connect it to a ground terminal.

5. The combination with an electric-current collector for vehicles, of means for holding the collector in inoperative position with respect to a supply circuit, the said means serving also to connect the collector to a ground terminal and to disconnect it from the wiring system of the vehicle, when said collector is brought to inoperative position.

In testimony whereof, I have hereunto subscribed my name this 19th day of January 1921.

PAUL L. MARDIS.